(12) United States Patent
Hessert et al.

(10) Patent No.: US 6,587,207 B2
(45) Date of Patent: Jul. 1, 2003

(54) METHOD FOR PRODUCING TIME MARKS AT ANY POINTS ON MOVING COMPONENTS

(75) Inventors: Roland Hessert, Niederroth (DE); Michael Zielinski, Unterschliessheim (DE); Gerhard Ziller, Dachau (DE)

(73) Assignee: MTU Aero Engines GmbH, Munich (DE)

( * ) Notice: Subject to any disclaimer, the term of this patent is extended or adjusted under 35 U.S.C. 154(b) by 142 days.

(21) Appl. No.: 09/913,873
(22) PCT Filed: Dec. 20, 2000
(86) PCT No.: PCT/DE00/04537
§ 371 (c)(1), (2), (4) Date: Oct. 13, 2001
(87) PCT Pub. No.: WO01/46654
PCT Pub. Date: Jun. 28, 2001

(65) Prior Publication Data
US 2002/0159071 A1 Oct. 31, 2002

(30) Foreign Application Priority Data
Dec. 21, 1999 (DE) .......................... 199 61 830

(51) Int. Cl.⁷ ................................ G01B 9/02
(52) U.S. Cl. ..................................... 356/479
(58) Field of Search ................. 356/450, 479, 356/497, 498, FOR 107, FOR 120

(56) References Cited

U.S. PATENT DOCUMENTS 3,879,988 A    4/1975  Jacobs
5,267,016 A  * 11/1993 Meinzer et al. ............. 356/498
5,557,099 A    9/1996  Zielinski et al.

FOREIGN PATENT DOCUMENTS

| DE | 195 48 158 | 6/1997 |
| JP | 05-187972  | 7/1993 |
| WO | 99/40398   | 8/1999 |

* cited by examiner

Primary Examiner—Samuel A. Turner
Assistant Examiner—Patrick Connolly
(74) Attorney, Agent, or Firm—Kenyon & Kenyon

(57) ABSTRACT

In a method for generating time markers of arbitrary points on moving components and an optical trigger device for performing the method, light from a broadband light source with a correspondingly short coherence length is split into two paths, namely a measurement light path and a reference light path, and is coupled into two optical waveguides, the light of the reference light path is at least partially coupled back and the light of the measurement light path is focused at a measurement point and reflected by the component passing through the focus, wherein the light distances in the measurement light path up to the focus and in the reference light path up to the coupling-back plane are of the same length within the coherence length of the radiated light, wherein the coupled-back light from the reference light path and the measurement light path is brought to interference and detected by a detector, and wherein a short modulation event occurs at the detector when the component passes through the focus.

8 Claims, 3 Drawing Sheets

METHOD FOR PRODUCING TIME MARKS AT ANY POINTS ON MOVING COMPONENTS

FIELD OF THE INVENTION

The present invention relates to a method for generating time markers of arbitrary points on moving components and to an optical trigger device for generating such time markers.

BACKGROUND INFORMATION

In the development of modern turbine engines, for example, oscillation measurements on the highly loaded blades of the rotors are very important. Critical oscillations must be identified in sufficient time. At the same time, the measurements supply data for the design programs and for estimating the service life of the blades. To date, the measurements have, in the majority of cases, been performed using strain gauges, which is associated with considerable costs and lead times due to the necessity for complex cabling which is resistant to centrifugal force and a telemetry system for signal transmission.

Optical measurement methods have been developed in order to avoid the difficulties outlined above. Trigger probes are mounted at different peripheral positions in the housing of the component to be measured, such as, e.g., a rotor blade of a turbine engine, with which it is possible to measure the travel times of the blades between the probes. In the absence of oscillation, the travel times are determined by rotational speed, rotor radius and peripheral position of the probes. Oscillations result in a change in the travel times since the blades pass the probes earlier or later—depending on the instantaneous phase angle of the oscillatory movement. Amplitude and frequency of the oscillations are determined from the travel time deviations from the undisturbed values.

In order to generate the time or position signals of the blades, probes are built into the housing above the rotor, which probes supply a signal when the tip of a blade passes through the measurement region of the probes. Time markers are derived from the resultant analog signals by electronic devices, which time markers are correlated with a defined position of the blade tips. In special cases, the probes can also project into the flow channel. Trigger signals are then derived from the leading or trailing edge of the blades.

Conventional probe configurations have a significant disadvantage in that time markers can be generated only at the edges of the blades, normally at a location on the blade tip. Oscillatory forms actually having a node are not detected. Moreover, when the probes are built into the flow channel for measurement on the leading and trailing edge of the blades, the flow is considerably disturbed.

It is therefore an object of the present invention to provide a method for generating time or precision markers which may generate time markers at arbitrary points on moving components. It is another object of the present invention to provide a largely flexible application and, in particular, free position-ability of the probes. Furthermore, it is an object of the present invention to provide an apparatus for performing the method.

SUMMARY

The present invention provides a method for generating time markers of arbitrary points on moving components, wherein light from a broadband light source with a correspondingly short coherence length is split into two paths, namely a measurement light path and a reference light path, and is coupled into two optical waveguides, the light of the reference light path is at least partially coupled back and the light of the measurement light path is focused at a measurement point and reflected by the component passing through the focus, wherein the light distances in the measurement light path up to the focus and in the reference light path up to the coupling-back plane are of the same length within the coherence length of the radiated light, wherein the coupled-back light from the reference light path and the measurement light path is brought to interference and detected by a detector, and wherein a short modulation event occurs at the detector when the component passes through the focus.

The method according to the present invention uses a broadband light source. The light emitted by this light source is split into two paths by a beam splitter. One portion of the light is fed into a measurement optical waveguide and the other part is fed into a reference optical waveguide. The light of the measurement light path emerges at the end of the optical waveguide and is focused in front of the optical waveguide. The focus constitutes the measurement point. The light of the reference light path is at least partially coupled back. This may either be achieved directly at the end face of the optical waveguide or by a separate mirror.

If a moving component passes through the focus of the measurement light path, part of the light is reflected and coupled back into the measurement optical waveguide. The coupled-back portions of the measurement light path and of the reference light path are then brought to interference and detected by a detector.

At the detector, modulation of the light intensity occurs as a result of the interference of the two light paths when the light distances in the measurement light path up to the focus and in the reference light path up to the coupling-back plane are of the same length within the coherence length of the radiated light. Therefore, the arrangement is to be calibrated so that this condition is met precisely in the focus region of the measurement light path. If a component then passes through the light beam of the measurement light path at the focus, the intensity of the reflected light coupled back into the optical waveguide reaches a maximum. While the maximum is traversed, modulation of the light intensity momentarily occurs at the detector in accordance with the shortness of the coherence length of the light source, the modulation frequency being dependent on the wavelength of the light used and on the speed of the component. This modulation event may be used to derive a trigger pulse of high temporal accuracy.

A Michelson interferometer may be used as the beam splitter and for interference of the coupled-back light portions, it also being possible to use other interferometric arrangements.

The present invention provides an optical trigger device for generating time markers of arbitrary points on moving components, which includes a broadband light source with a correspondingly short coherence length, an arrangement configured to split the light from the light source into two paths, namely a measurement light path and a reference light path, which each include an optical waveguide and an arrangement configured to feed the light into the respective optical waveguides, an arrangement configured to focus the light emerging from the measurement optical waveguide at a measurement point, an arrangement configured to couple back the light of the reference light path, an arrangement configured for interference of the coupled-back light of the two paths, and a detector for detection of the interfering, coupled-back light.

The optical trigger device according to the present invention may be used to generate time markers of arbitrary points on moving components. The trigger device according to the present invention includes a broadband light source. The light emerging from this light source is split into two paths, namely a measurement light path and a reference light path.

The light of the measurement light path is fed into a measurement optical waveguide and the light of the reference light path is fed into a reference optical waveguide. Both optical waveguides lead to a probe. In this probe, the light emerges from the measurement optical waveguide and is focused at a measurement point. The light of the reference light path is at least partially coupled back into the reference optical waveguide again. This may be achieved either by reflection at the boundary surface of the optical waveguide or by a separate mirror.

If a component to be measured, for example, a rotor blade of a turbine engine, passes through the focus of the measurement light path, the light is partially reflected and coupled back into the measurement optical waveguide. The coupled-back light portions are combined from the two paths and then interfere with one another. A detector detects the interfering, coupled-back light of the two paths.

At the detector, modulation of the light intensity occurs when the two distances in the measurement and reference light paths are of the same length within the coherence length. Therefore, the apparatus may initially be calibrated so that this condition is met precisely at the focus in front of the probe. For this purpose, in the device according to the present invention, an arrangement is provided which enables the optical path length of the reference light path and/or of the measurement light path to be adjusted. This may be achieved, for example, by an axial adjustment possibility of the coupling-in optics for coupling the split light from the light source into the optical waveguides.

If the component to be measured passes through the focus of the measurement light path, the intensity of the coupled-back light reaches a maximum. As a result of the tuning of the arrangement, modulation of the light intensity briefly occurs at the detector during the maximum, the length of the modulation event being dependent on the coherence length of the light source used and the modulation frequency being dependent on the wavelength of the light used and on the speed of the component.

A Michelson interferometer may be used for splitting the light from the light source into two paths and for bringing about the interference of the coupled-back light portions. As an alternative, e.g., a fiber interferometer may be used.

The end of the measurement optical waveguide and the focusing optics may be combined in a probe in which the reference optical waveguide may also end. The measurement probe is easily positioned. The position of the focus of the measurement light path may be adjustable in order to enable adaptation to the space conditions available during the measurement. In order to achieve optimum adaptation to the component to be measured and its accessibility, the light beam from the reference light path may emerge obliquely from the probe. The probe may be provided with an oblique window for this purpose.

In the apparatus according to the present invention, a plurality of optical waveguides for simultaneously generating trigger signals of a plurality of points on a component surface may be built into a probe.

The two optical waveguides of the measurement and reference light paths may extend in close contact over their entire length. As a result, optical length changes caused by temperature fluctuations, oscillations and similar effects occur to the same extent in both paths and do not cause a disturbance.

The reference light path may be provided with an arrangement for attenuating the light intensity in order to enable the signal intensity to be tuned to that of the measurement path. This may be achieved by an attenuator disc.

A fiber interferometer may be used for splitting the light between the two paths and subsequently uniting it.

Electronic devices may be used to derive an accurate time marker from the high-frequency output signal of the detector.

In the apparatus according to the present invention, a plurality of optical waveguides for simultaneously generating trigger signals of a plurality of points on a component surface may be built into a probe.

DETAILED DESCRIPTION

Figure 1:
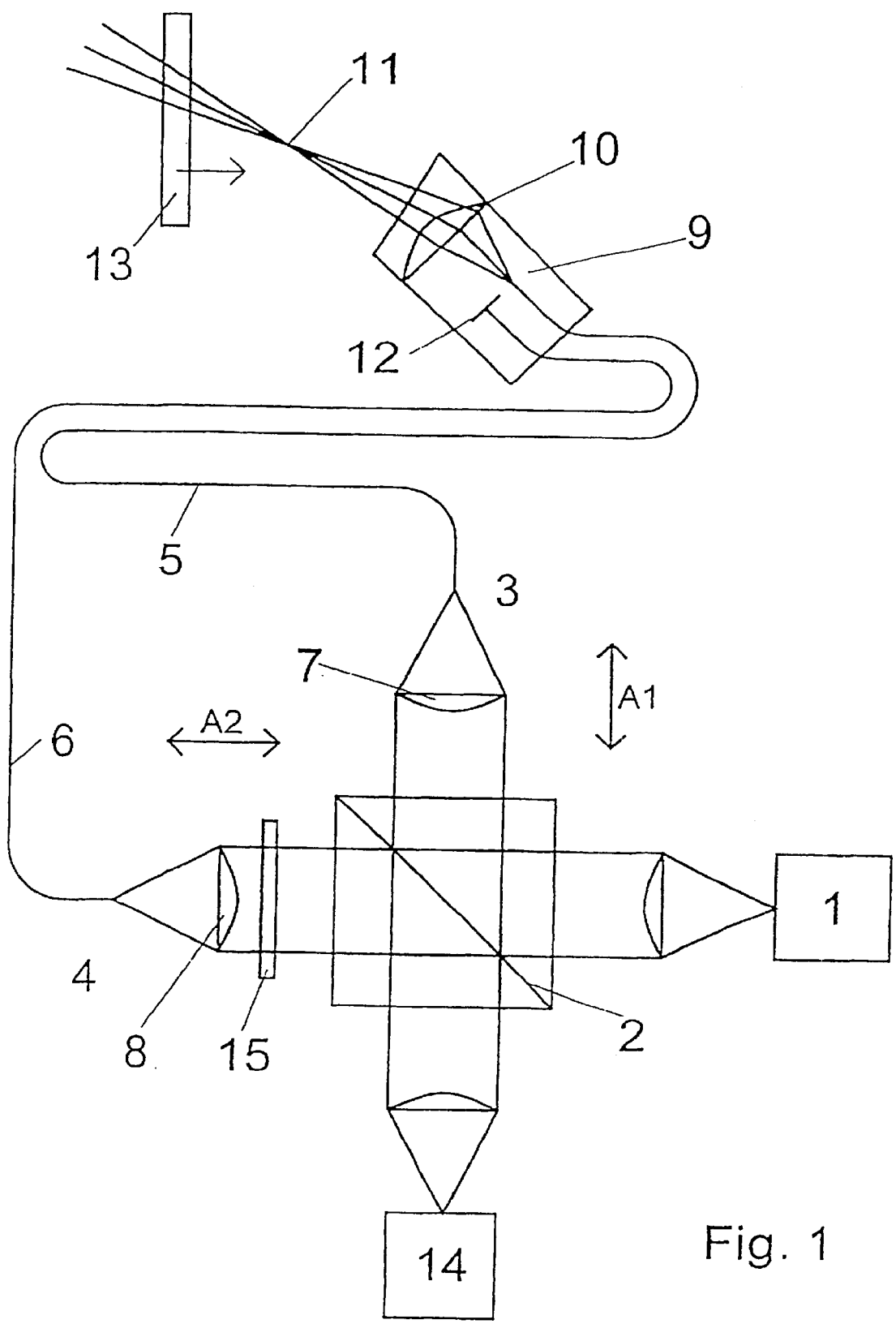
FIG. 1 is a schematic view of an optical trigger device according to the present invention.

FIG. 1 illustrates a broadband light source 1 which emits in the visible region. This is a light-emitting diode having the wavelength $\lambda=630$ nm in the present case. The bandwidth is $\Delta\lambda=50$ nm. The coherence length $l_k$ then results from $l_k=\lambda^2/\Delta\lambda$. The coherence length is thus approximately 8 $\mu$m. The light from the light source is radiated into a Michelson interferometer provided with a beam splitter 2. The beam splitter splits the light from the light source 1 into a measurement light path 3 and a reference light path 4. The light is firstly collimated and is directed after splitting by the lens systems 7 and 8 into the respective optical waveguides 5, 6. The optical waveguides are kept in close contact over as much of their length as possible. As a result, optical length changes caused by temperature fluctuations, oscillations and other effects occur equally in the two paths and do not cause a disturbance. In the probe 9, the light emerges from the measurement optical waveguide 5 and is focused at the focus 11 by a lens system 10. The light of the reference optical waveguide 6 is at least partly coupled back at the end 12 of the said waveguide.

In order to generate a time marker, a component 13 to be measured, for example a rotor blade of a turbine engine, is moved through the focus 11. As a result, the light is partially reflected and coupled back into the measurement optical waveguide 5. The coupled-back light impinges on the beam splitter 2 of the Michelson interferometer. The light interferes with the coupled-back light of the reference light path 4 and is detected by the detector 14.

At the detector 14, modulation of the light intensity occurs when the distances of the two light paths 3, 4 are the same within the coherence length. Therefore, the arrangement is initially to be calibrated so that this condition is met precisely at the focus 11 in front of the probe 9. For this purpose, in the construction illustrated, an axial adjustment possibility A1, A2 is provided in order to have the greatest possible freedom with the position of the focus 11.

In order to be able to adapt the signal intensity of the reference light path 4 to the signal intensity of the measurement light path 3, the reference light path 4 is provided with an attenuator disc 15.

Figure 2:
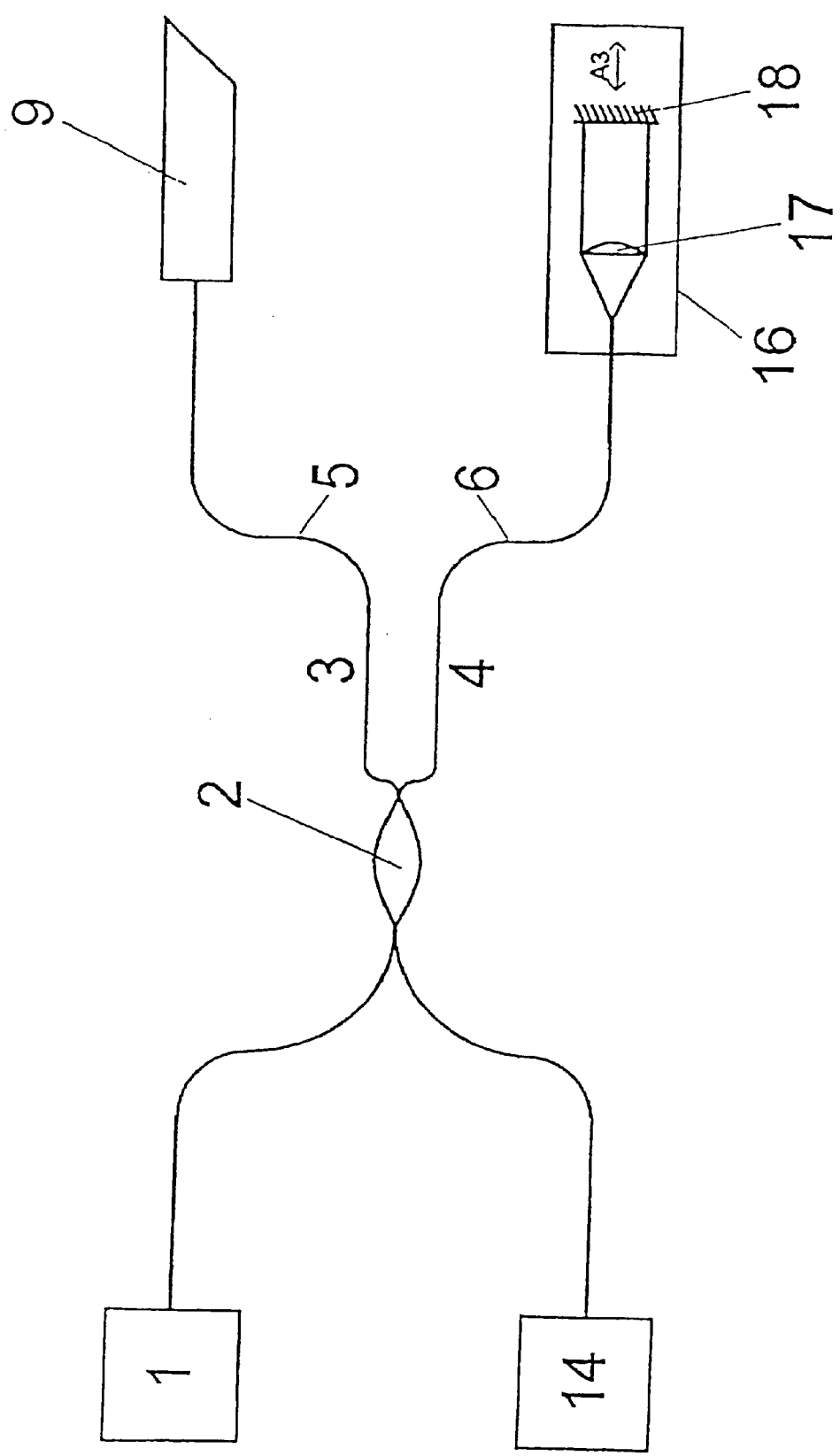
FIG. 2 is a schematic view of an optical trigger device according to the present invention having a fiber-optic beam splitter.

FIG. 2 illustrates an optical trigger device which operates in the same manner, in principle, and in which a fiber-optic beam splitter 2 is used. The light from the light source 1 is coupled into a fiber and, at the fiber-optic beam splitter 2, split into a measurement light path 3 and a reference light path 4. The measurement optical waveguide 5 leads to a probe 9, which is constructed in the manner explained and illustrated in FIG. 1. The reference optical waveguide 6 leads to an adjusting unit 16, in which the light beam is collimated by suitable optics 17 and reflected at a mirror 18. The mirror is provided with an adjustment possibility A3. This enables the effective optical path length of the reference light path 4 to be adjusted. The calibration of the path lengths of the two light paths which is necessary before time markers are generated may thus be achieved despite the lack of an adjustment possibility on the fiber-optic beam splitter 2.

Figure 3A:
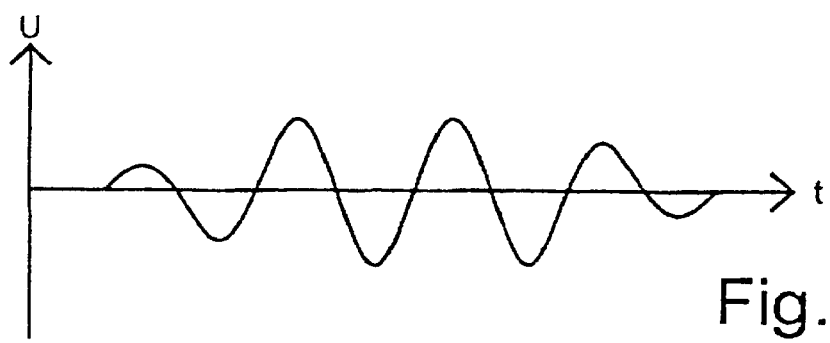
FIGS. 3a to 3d graphically illustrate an output signal of a detector and a derivation therefrom of an accurate time marker.
Figure 3B:
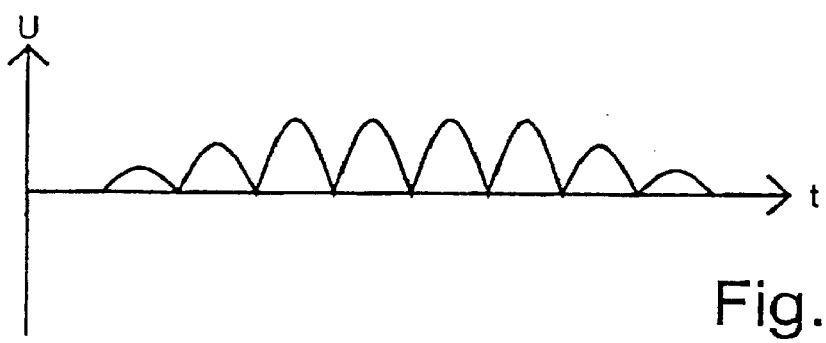
Figure 3C:
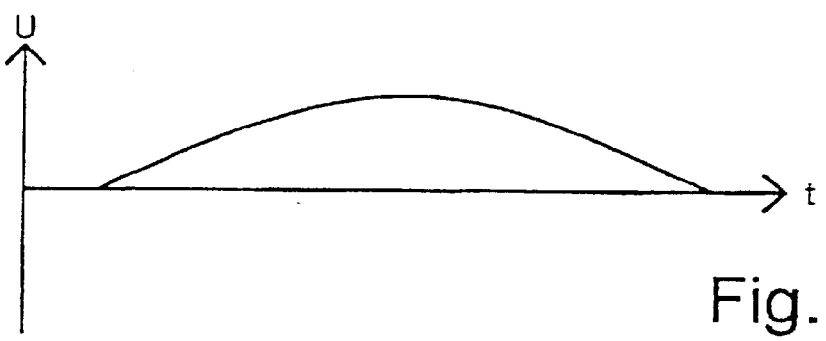
Figure 3D:
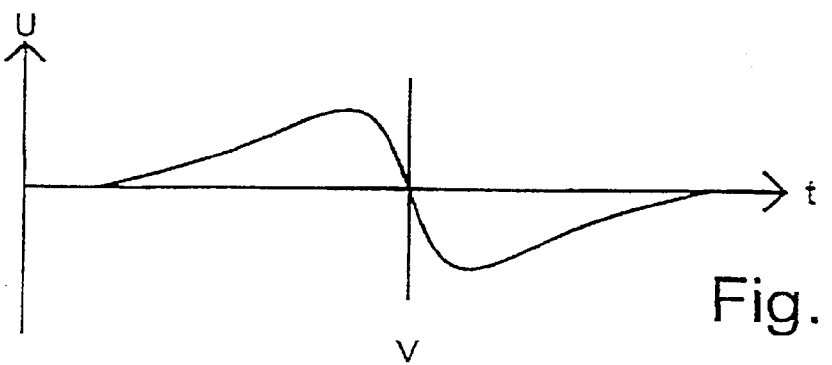

FIGS. 3a to 3d illustrate the signal detected by the detector and the signals produced after exemplary processing. In order to generate a time marker, the component to be measured, for example a turbine blade, moves through the focus of the measurement light path. As a result, the light is reflected and partially coupled back into the measurement light path. That leads to modulation of the signal to be detected at the detector. Given a wavelength of 630 nm, for example, and peripheral speeds of a turbine blade in the range between 10 and 500 m/s, this leads to modulation frequencies of from 30 to 1600 MHz. After passing through a high-pass filter, the signal has the form illustrated in FIG. 3a. The signal illustrated in FIG. 3b is then achieved after rectification. By using a low-pass filter, the signal assumes the form illustrated in FIG. 3c. A time marker V, as is illustrated in FIG. 3d, may be formed, e.g., after differentiation of the signal illustrated in FIG. 3c at the negative zero crossing of the resulting signal.

What is claimed is:

1. A method for generating time markers of arbitrary points on moving components, the method comprising the steps of:

splitting light from a broadband light source having a correspondingly short coherence length into two paths, the two paths including a measurement light path and a reference light path;

coupling the two light paths into two optical waveguides;

at least partially coupling back light of the reference light path;

focusing light of the measurement light path at a measurement point; and reflecting light of the measurement light path by the component passing through the measurement point, light distances in the measurement light path up to the measurement point and in the reference light path up to a coupling-back plane being of the same length within the coherence length of the light;

interfering the coupled-back light from the reference light path and the measurement light path;

detecting the interference with a detector;

wherein a short modulation event occurs at the detector when the component passes through the measurement point.

2. The method according to claim 1, wherein the splitting step and the interfering step are performed by a Michelson interferometer.

3. An optical trigger device for generating time markers of arbitrary points on moving components, comprising:

a broadband light source having a correspondingly short coherence length;

an arrangement configured to split the light from the light source into two paths, the two paths including a measurement light path and a reference light path, each path including an optical waveguide and an arrangement configured to feed the light into the respective optical waveguide;

an arrangement configured to focus the light emerging from the measurement optical waveguide at a measurement point;

an arrangement configured to couple back the light of the reference light path, a light distance in the measurement light path up to the measurement point and in the reference light path up to a coupling-back plane being of a same length within a coherence length of the light;

an arrangement configured for interference of the coupled-back light of the measurement light path and the reference light path; and a detector configured to detect the interfering coupled-back light at which a short modulation event occurs when the component passes through the measurement point.

4. The device according to claim 3, wherein an optical path length of at least one of the measurement light path and the reference light path is adjustable.

5. The device according to claim 3, wherein the arrangement configured to split the light and the arrangement configured for interference of the coupled-back light include a Michelson interferometer.

6. The device according to claim 3, wherein a position of the measurement point is adjustable.

7. The device according to claim 3, wherein a light intensity of the reference light path is adjustable.

8. The device according to claim 3, further comprising a plurality of measurement light paths configured to simultaneously generate trigger signals of a plurality of points on moving components.

\* \* \* \* \*